April 28, 1953 W. J. DURING, SR., ET AL 2,636,635
PRESSURE COOKER CLOSURE
Filed Aug. 20, 1947 3 Sheets-Sheet 1

INVENTORS:
WILLIAM J. DURING SR.
& WILLIAM J. DURING JR.
BY
Theodore E. Simonton
ATTORNEY.

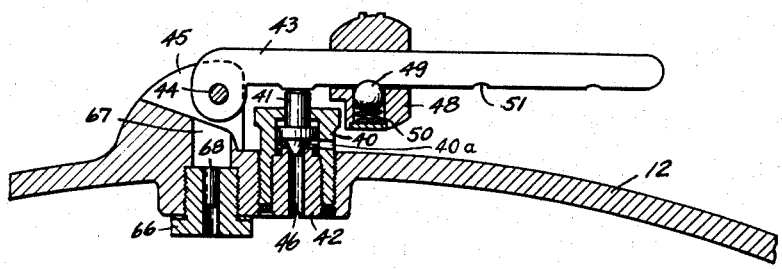
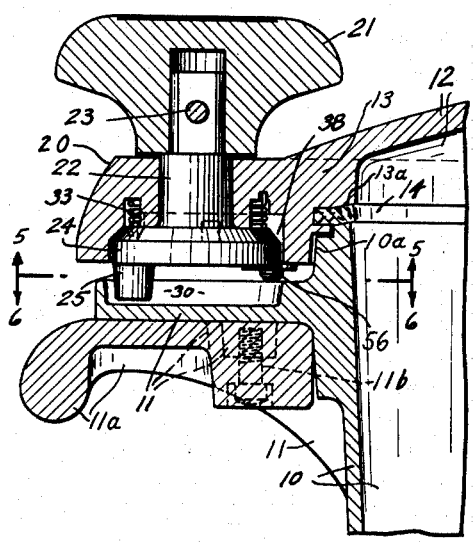
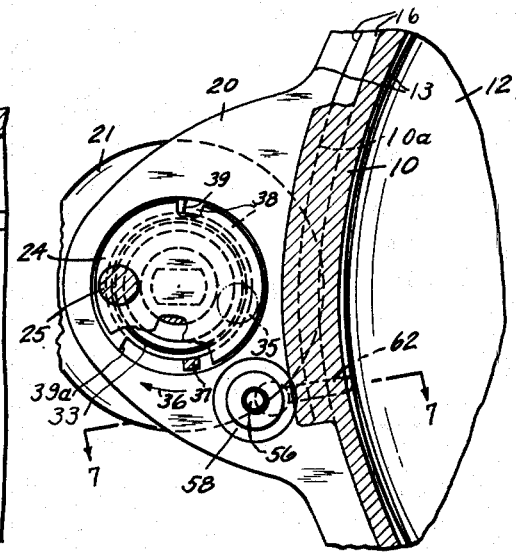
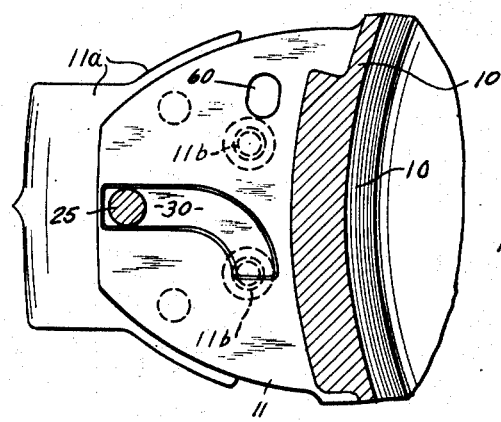
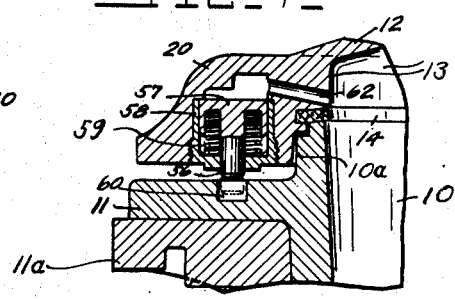

April 28, 1953 W. J. DURING, SR., ET AL 2,636,635
PRESSURE COOKER CLOSURE
Filed Aug. 20, 1947 3 Sheets-Sheet 3
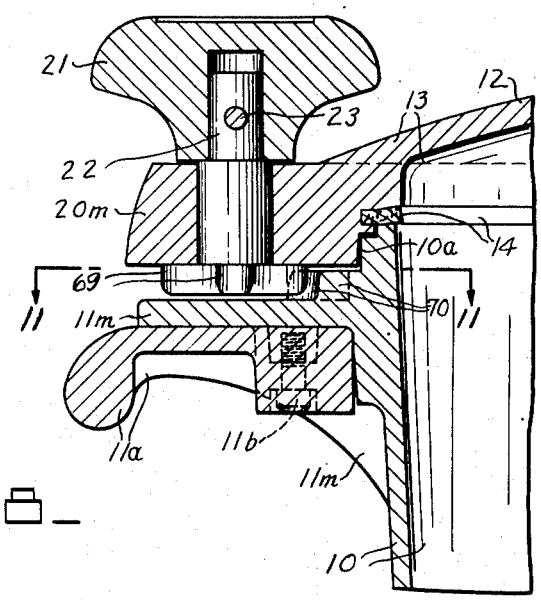
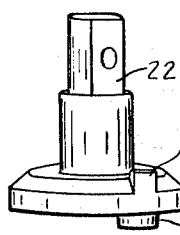
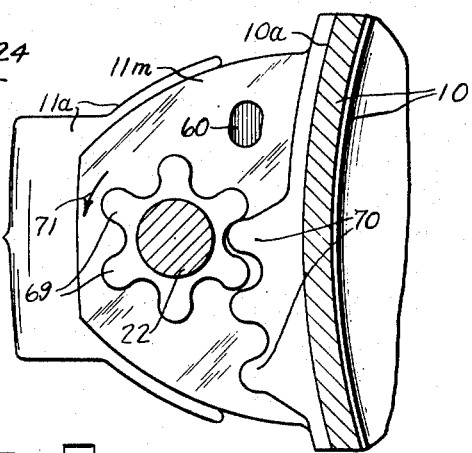
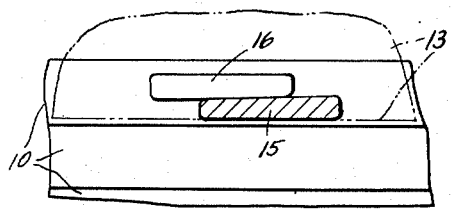
INVENTORS:
WILLIAM J. DURING SR.
& WILLIAM J. DURING JR.
BY
Theodore E. Simonton
ATTORNEY.

Patented Apr. 28, 1953

2,636,635

UNITED STATES PATENT OFFICE 2,636,635

PRESSURE COOKER CLOSURE

William J. During, Sr., and William J. During, Jr., Fayetteville, N. Y.

Application August 20, 1947, Serial No. 769,734

2 Claims. (Cl. 220—40)

The invention relates primarily to pressure cookers of the kind comprising a cooking receptacle or vessel and a detachable closure or cover which, when the cooker is in use, are held in a tight sealed engagement in which they provide a pressure tight cooking chamber.

The principal object of the invention is to provide a pressure cooker of the aforesaid kind which will function efficiently, is of simple construction, and may be used with ease and safety.

A further object of the invention is to provide a pressure cooker of the aforesaid kind having improved means for releasably securing the closure on the receptacle.

A further object of the invention is to provide a pressure cooker of the aforesaid kind wherein the closure and receptacle portions of the cooker are provided with means which are engageable by relative rotation of said portions to seat the closure portion tightly on the receptacle portion and securely interlock said portions of the cooker, and wherein one of said portions of the cooker has manually movable means mounted thereon and engageable with the other portion of the cooker for relatively rotating said portions of the cooker into and out of interlocked relation at will.

A further object of the invention is to provide a pressure cooker of the aforesaid kind which is readily portable and in which the receptacle and a closure are relatively rotative into and out of cooking chamber forming interlocked engagement by two driving means which are arranged at opposite sides of the cooker to be located externally of the cooking chamber, and each of which driving means comprises a lifting handle located at the upper side of the closure and held to the closure for rotation of said handle, means rotative by said handle, and fixed means on the receptacle with which said rotative means is coactive to effect relative rotation between the closure and receptacle when the handle is rotated in each direction.

A further object of the invention is to provide a pressure cooker having a receptacle and closure relatively rotative into and out of an interlocked relation in which they form a sealed cooking chamber, and means responsive to pressure in the cooker to lock the closure and receptacle against rotation out of said interlocked relation while pressure in the cooking chamber equals or exceeds a selected low pressure at which it is safe to remove the closure.

A further object of the invention is to provide a pressure cooker having an improved coordinated arrangement of two pressure relief valves one of which is a thermally responsive safety valve and the other one of which is a pressure responsive valve operative to prevent pressure in the cooker from exceeding a selected maximum.

Other objects and advantages of the invention will appear from the following description in detail of the two illustrative embodiments of the invention illustrated in the accompanying drawings.

In the drawings, like reference characters designate corresponding parts.

Figure 3 is a fragmentary sectional view taken on the line 3—3 of Figure 2;

Figure 4 is a fragmentary sectional view taken on the lines 4—4, 4—4 of Figure 2;

Figure 5 is a view taken on the line 5—5 of Figure 4;

Figure 6 is a view taken on the line 6—6 of Figure 4;

Figure 7 is a view taken on the line 7—7 of Figure 5;

Figure 8 is a perspective view of a part of one of the means for effecting relative rotation of the closure and receptacle of the cooker;

Figure 9 is a detail view showing a feature of the cooker; and

Figure 1:
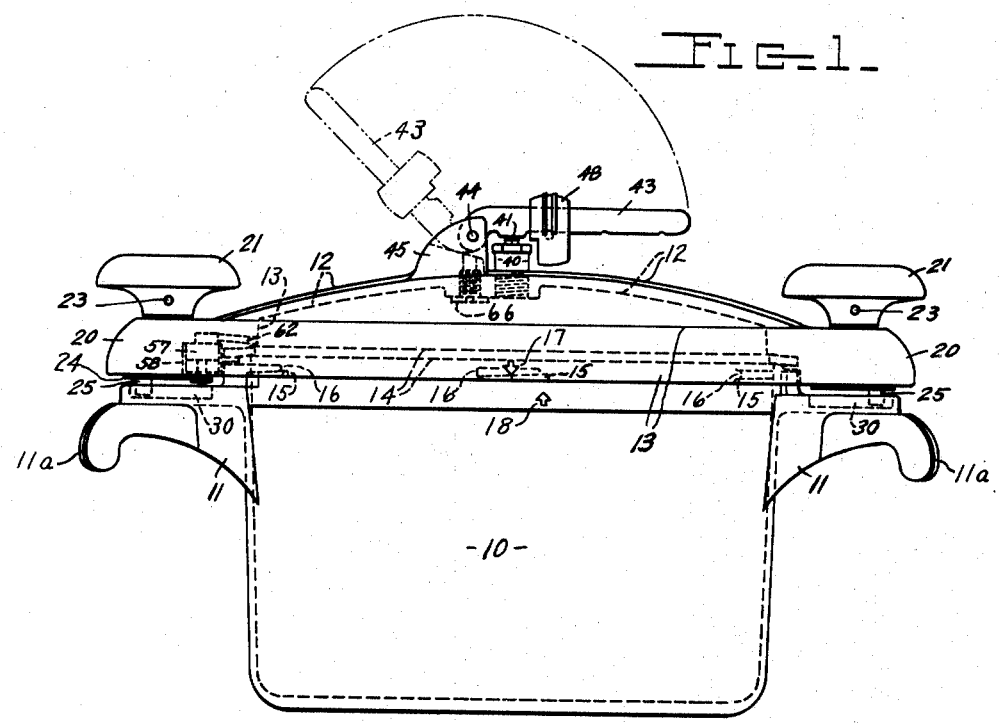
Figure 1 is a side elevation of a pressure cooker embodying the invention.

Figures 10 and 11 are views similar respectively to Figures 4 and 6 and showing a modified form of cooker embodying the invention, Figure 11 being a sectional view taken on the line 11—11 of Figure 10.

The cooker shown in Figures 1 to 9 will be first described.

The cooker includes an open top receptacle or vessel 10, preferably formed of cast metal, said receptacle being formed with a cylindrical upper portion and preferably being substantially cylindrical throughout its depth. The receptacle is seatable in an upright position and has extending radially outward therefrom at diametrically opposite points two projections 11 which are fixedly held to the receptacle and preferably are integral therewith. The projections 11 are located a short distance below the top of the receptacle and form the inner parts of two handles for the receptacle. Each handle has a second or hand grip part 11a which extends out from beneath part 11 thereof radially of the receptacle and is fixedly held to its associated part 11 by suitable fastening means 11b, said parts 11a of the handles preferably being formed of heat insulating material.

The cooker includes a detachable closure or cover adapted to seal the receptacle when interlocked therewith, said closure having a top wall 12 which is preferably formed of cast metal and is formed with an integral pendent annular flange 13, the top wall being preferably of dome-like form. The closure flange is recessed part way up from its lower edge at the inner side of the flange to loosely receive in the recess the cylindrical upper portion of the receptacle and to provide on said flange a downwardly facing annular shoulder 13ª adapted to overlie the top edge of said upper portion of the receptacle. The closure preferably also includes an annular sealing gasket 14 which is preferably formed of compressible material, such as rubber, and has its outer portion confined in an annular groove which is formed in the recessed portion of the closure flange along the shoulder 13ª. The inner portion of the gasket abuts shoulder 13ª and is seatable at its bottom face on the top edge of the receptacle for compression of the gasket between said shoulder and receptacle edge to form a pressure-tight joint between the receptacle and closure.

The receptacle and closure are provided with means whereby, while the closure is fitted on the upper portion of the receptacle, relative rotation between the closure and receptacle in one direction about the vertical axis of the cooker will draw the closure and receptacle together into tight sealing engagement and will positively interlock them against direct axial separating movement and securely frictionally lock them against accidental reverse rotation, said means being releasable, upon relative rotation between the closure and receptacle in the opposite direction, to free the closure for lifting thereof off of the receptacle. Said means comprises a plurality of substantially flat lugs or projections 15 which are formed on and extend radially inward from the closure flange 13 adjacent the lower edge of the flange and are arranged to lie flatwise in a common horizontal plane parallel to the seating plane of the receptacle when the closure is applied to the receptacle. The lugs 15 are of wedge form and have their top faces sloping in the same direction circumferentially of the cooker entirely across each lug at an angle to said common plane which is within the angle of repose or friction. Six of the lugs 15 are provided in the construction of cooker shown in the drawings. A corresponding number of correspondingly spaced substantially flat lugs or projections 16 are formed on and extend radially outward from the receptacle adjacent the top of the receptacle and above the level of the receptacle handles. The lugs 16 are of wedge form and are arranged flatwise in a common horizontal plane parallel to the seating plane of the receptacle and have their bottom faces all sloping relatively to said plane circumferentially of the cooker entirely across each lug at the same angle to said plane at which the top faces of lugs 15 are sloped relatively to the plane of the set of lugs 15.

The two sets of lugs 15 and 16 are so arranged on the closure and receptacle that lugs 15 are wedgeable under lugs 16 (as shown in Figure 9) to draw the closure down on the receptacle and compress the gasket 14 between the aforesaid closure shoulder 13ª and the upper edge of the receptacle with the lower edge of the closure flange 13 out of contact with the receptacle and the receptacle handles, as shown. The shapes of the lugs of the two sets of wedge-like lugs described permits them to be easily wedged into a tight-holding frictional engagement which will securely hold the closure and receptacle interlocked against accidental relative rotation in closure releasing direction. The sets of lugs or locking wedges will positively interlock the closure and receptacle against direct axial separation while the lugs 15 are engaged under lugs 16 and, by reason of their aforesaid wedge shape, will securely hold the closure and receptacle against accidental rotation out of interlocked relation even while the lugs 15 and 16 are only slightly overlapped. The wide sloping faces of the lugs also afford a relatively wide range of wedging action to insure tight sealing of the cooker.

Figure 2:
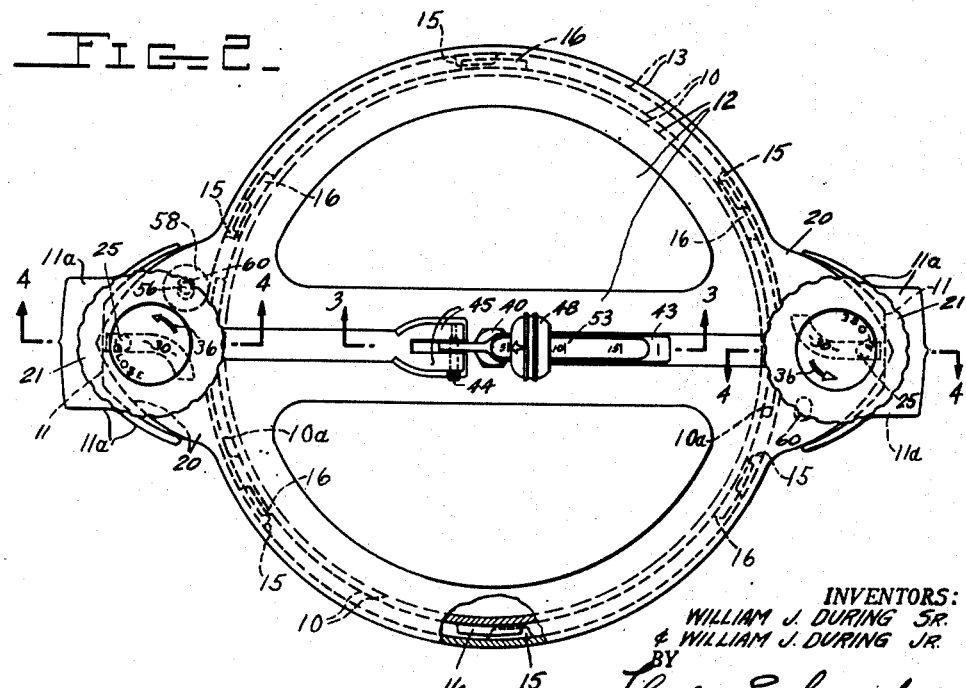
Figure 2 is a top plan view of said cooker.

The sizes and spacing of the lugs of the two sets of lugs are such that the lugs 15 may be passed vertically between the lugs 16 when the closure is rotated slightly counterclockwise as viewed in Figure 2 from the position thereof shown in the drawings. The lugs 15 on the closure and the lugs 16 on the receptacle serve to approximately center the closure on the receptacle for relative rotation of the closure about a common axis which is normal to the seating plane of the receptacle. Preferably the receptacle is provided adjacent each projection 11 with an arcuate projection 10ª to assist in so centering the closure on the receptacle. The closure and receptacle preferably are provided with arrow-shaped indicia 17 and 18 at the exterior thereof which, when in vertical register, position the lugs 15 for vertical passage thereof past or between lugs 16 with the thinner edges of the two sets of lugs closely adjacent. When the closure is fitted on the receptacle with the indicia 17 and 18 in register, the closure and receptacle may be interlocked and released by relative rotating movements of small amplitude.

The cooker is provided with means whereby a user may handle the closure with ease and safety and may effect relative rotation of the closure and receptacle into and out of interlocked relation with ease and dispatch, which means will now be described.

The closure is provided with two projections 20 which extend radially and horizontally outward from the flange 13 of the closure at diametrically opposite points and which preferably, as shown, are of approximately the same shape and size in plan as the projections 11 on the receptacle. The projections 20 are fixedly held to and preferably are formed integrally with the closure and are adapted to overlie projections 11 without contacting the latter when the closure is in sealed position on the receptacle. Above each projection 20, and abutting a flat upper surface portion of the projection, is one of two knobs or handles 21 each of which preferably is formed of heat insulating material. Each such knob or handle is fixed by a pin 23 to the upper end of a different one of two vertically disposed handle shafts 22, each of which is journaled in a different one of the closure projections 20. Each shaft 22 has fixed on its lower end coaxially with the shaft a disk 24 which is seated in a downwardly facing recess in a flat bottom face of the projection 20 in which the shaft is journaled. Each shaft is held against axial movement by the knob and disk fixed thereto.

Each disk 24 is formed with a depending vertically disposed crank or wrist pin 25 which is eccentric to the axis of the associated disk and shaft. The recess in the bottom of each closure projection 20 is enlarged part way therearound as shown at 36 to afford clearance for an upstanding stop lug 37 which is formed on the disk 24 seated in said recess. The enlargement 36 of each such recess affords two stop shoulders 39 and 39a for engagement by said stop lug 37 to limit rotation of the associated parts 21—22—24—25. The top wall of each recess in each projection 20 has formed therein an annular groove which affords clearance for a torsion spring 33 which is anchored at its opposite ends respectively to said projection and the associated disk 24 to normally urge stop 37 on said disk to stop shoulder 39.

While the two handles and their associated crank or wrist pins are in normal position and the closure is seated on the receptacle with the indicia 17—18 in vertical register, each of the two crank pins 25 will be engaged in the arcuate inner end portion of a different one of two cam slots or grooves 30. Each of these cam slots is formed in the flat top of a different one of the projections 11 on the receptacle 10. Each slot has an elongate straight outer portion, the straight portions of the two slots being diametrically opposed and being located medially of the projections 11, and the arcuate inner portions of the two slots being curved in different directions from the inner ends of said straight slot portions. Preferably, the cam slots are slightly outwardly flared and the pins 25 are correspondingly tapered, as shown, to facilitate engagement of pins 25 in the slots.

The inner portion of each one of the cam slots is curved in correspondence with the curvature of the path of travel of pins 25 about the axes of the handle shafts, and the inner ends of the slots are spaced diametrically of the cooker in correspondence with the normal spacing of pins 25 diametrically of the cover, i. e. with the spacing of the pins while stops 37 are engaged with stop shoulders 39. The curved portions of the cam slots curve away from the straight portions in directions opposite to that in which the handles and wrist pins are rotative for interlocking the closure and receptacle. The two handles are rotative about parallel axes located at diametrically opposite positions around the center of the closure.

When the closure is fitted on the receptacle and both handles 21 are rotated simultaneously from normal position in the direction indicated by the arrows 36 (Figures 2 and 5), each crank pin 25 will move from its normal position (indicated at 35 in Figure 5) toward the outer end of the cam slot 30 in which the pin is engaged and, as the pins begin to travel outward along the straight portions of the slots, they will cam the closure clockwise as viewed in Figure 2 into the tight sealing interlocked relation of the closure with the receptacle shown in the drawings. Reverse rotation of the handles causes the pins to cam the closure around to displace lugs 15 from beneath lugs 16 to permit removal of the closure.

While the closure could be rotated into and out of the interlocked relation with the receptacle by a single one of the handle operated mechanisms described, the provision of two such mechanisms facilitates the effecting of such rotation and also facilitates easy and safe carrying, applying and removing of the closure and is preferred.

The stop shoulders 39a are coactive with stops 37 to prevent any such over-rotation of the handles from normal position as would break the torsion springs 33 which act to restore the handles to normal position upon release of the handles.

The closure of the cooker carries a pressure responsive vent valve device which is automatically operable to open and vent steam and/or hot air from the cooker whenever pressure in the sealed cooker exceeds a selected maximum and to close when the pressure does not exceed said maximum, a part of said valve device being manually movable at will for venting the cooker to permit opening of the cooker with safety. This pressure responsive valve device comprises an inverted cup-like casing 40 which is threaded in a central opening in the wall 12 of closure 12—13 and has threaded therein a sleeve 42 having an axial bore 46. A light piston valve 41 is slidable vertically in the casing 40 into and out of engagement with a seat formed on the upper end of sleeve 42. The casing has a vent port 40a therethrough above the valve seat which is placed in communication with the interior of the cooker via bore 46 when the piston valve is forced off its seat by pressure in the cooker. The piston valve has a stem projecting at all times through and slidable in an aperture in the top of the casing.

To hold the valve to its seat until pressure in the cooker exceeds a selected maximum, an arm 43 is pivoted at one end by a horizontal pivot 44 in a bifurcated and upstanding boss 45 which is formed on the closure wall 12 closely adjacent the valve casing 40 for swinging of said arm 43 into a substantially horizontal position in which it rests on top of the stem portion of piston valve 41. The arm 43 extends through a weight 48 which is slidably adjustable along the arm between the valve stem and the free outer end of the arm to vary the pressure required in the cooker to lift the valve from its seat. A ball latch or detent 49 and a spring 50 are mounted in the weight for pressure of the ball by the spring part way into any selected one of a plurality of notches 51 which are formed in arm 43 and are spaced longitudinally of the arm. The top face of the arm is provided with indicia 53 indicating settings of the weight for opening of the valve at various pressures.

The arm 43 may be manually swung upward and over center into the position shown in dotted lines in Figure 1 and will remain therein until again manually swung into engagement with valve 41. When the user desires to vent the cooker to reduce pressure therein to substantially atmospheric pressure, all that is necessary is to throw the arm into said position indicated in dotted lines and there leave it.

The cooker is preferably provided with a safety pressure vent device which is responsive to excessive heat applied to the cooker to open and remain open until the user closes the safety vent. For this purpose, the wall 12 of closure 12—13 has extending entirely therethrough directly under the pivot 44 and the pivoted end of arm 43 an aperture 67 into the lower end of which is threaded a thermally responsive vent device. This vent device comprises a sleeve 66 threaded into the lower end of aperture 67 and having its bore tightly plugged by a plug 68 of fusible material. This vent device is designed to keep bore 67 sealed until the cooker is subjected to a selected excessive unsafe high temperature at which the fusible plug 68 will soften or partly melt sufficiently to be blown out of sleeve 66 by pressure in the cooker. When so blown out of the sleeve, the plug will strike the pivoted end of arm 43 and be arrested thereby, or its velocity substantially spent, so that liability of the plug doing damage or injury when blown out is avoided. The boss 45 and valve casing 40 also assist in trapping a blown plug 68.

The cooker also may be provided with a latch or lock which, when the closure and receptacle are interlocked, is responsive to pressure in the cooker to positively prevent manual relative turning of the closure and receptacle out of interlocked relation so long as such pressure exceeds a selected value at which it is safe to release the closure.

For this purpose, there is threaded upward into a recess in one of the closure projections 20 a small piston cylinder 58 which is open at its upper end. Slidable vertically in this cylinder is a piston 57 having a stem or latch pin portion 56 pendent therefrom and extending slidably through an aperture in a bottom end wall of cylinder 58. An expansion spring 59 normally holds the piston lifted with the lower end of the pin or stem 56 slightly above the top of the underlying receptacle projection 11 while the cooker is assembled and there is insufficient pressure in the cooker to depress the piston against the resistance of spring 59. A passage 62 extends from the inner side of closure flange 13 into projection 20 to a point over piston 57.

With the cooker assembled for use, the piston 57 is depressible by pressure of a selected small value in the cooker to drive the stem or pin 56 down into a recess 60 formed in the underlying receptacle projection 11 and prevent sufficient relative rotation of the closure and receptacle to release the closure. Recess 60 is somewhat elongated across projection 11 as shown, so that pin 56 can engage therein in different interlocked relations of the closure and receptacle. When the pressure operated latch is in latching position, it may be released by the user lifting arm 43 to permit steam in the cooker to lift valve 41 and vent from the cooker.

The modified cooker shown in Figures 10 and 11 differs from that shown in Figures 1 to 9 only in the respects shown and now to be described.

The disk 24, crank pin 25 and the handle return spring 33 associated with each handle 21 are omitted in the modified construction as are also the recesses in the closure projections 20. The modified closure projections 20ᵐ of this form of cooker have flat horizontal bottom faces. Each handle shaft 22 journaled in each projection 20ᵐ has fixed on its lower end a pinion 69 which is coaxial with the shaft and the upper face of which pinion abuts the horizontal flat bottom face of the projection 20ᵐ.

In the modified cooker, the cam slot or groove 30 in each receptacle projection 11 is omitted. The modified receptacle projections 11ᵐ of the modified form of cooker have each formed thereon a short arcuate rack 70 which is concentric with the vertical axis of the cooker receptacle and has teeth projecting from its outer edge radially of the receptacle for meshing of each rack 70 with a different one of the pinions 69 when the closure is applied as described in connection with the cooker shown in Figures 1 to 9. The two racks 70 are located in diametrically opposite positions.

In Figures 10 and 11, the parts are shown in the relation thereof which exists while the closure and receptacle are interlocked in tight sealed relation. Upon simultaneous turning of the handles and pinions in the direction indicated by the arrows 71 (Figure 11), the pinion teeth will act on the rack teeth as drivers and cam the closure into non-interlocked relation with the receptacle and contrarotation of the pinion will cause interlocking of the closure and receptacle. Except as pointed out above, the two forms of cooker are of like construction.

We claim:

1. A pressure cooker comprising a receptacle having two radial projections located at opposite sides of its rim, a detachable cover having two radial projections located at opposite sides of its rim, said receptacle and cover being releasably engageable with said projections substantially coinciding and being relatively rotatable about a common vertical axis while so engaged into and out of an interlocked relation in which they form a sealed cooking chamber, an upwardly facing cam groove in each of said receptacle projections, two handles having shafts journaled in and extending down through said cover projections, and a pin eccentrically fixed to the lower end of each handle shaft and rotatable therewith in engagement with one of said cam grooves to effect relative rotation of the cover and receptacle by rotation of said handles while the cover and receptacle are engaged.

2. A pressure cooker comprising a receptacle having two radial projections located at opposite sides of its rim, a detachable cover having two radial projections located at opposite sides of its rim, said receptacle and cover being releasably engageable with said projections substantially coinciding and being relatively rotatable about a common vertical axis while so engaged into and out of an interlocked relation in which they form a sealed cooking chamber, two handles having shafts journaled in and extending down through said cover projections, a pendent wrist pin eccentrically fixed to the lower end of each handle shaft, and an upwardly facing cam groove in each of said receptacle projections for receiving a different one of said wrist pins, each of said cam grooves extending outwardly from the body of the receptacle toward the outer end of its projection, whereby relative rotation of the cover and receptacle is effected by rotation of said handles while the cover and receptacle are engaged.

WILLIAM J. DURING, Sr.
WILLIAM J. DURING, Jr.

References Cited in the file of this patent

UNITED STATES PATENTS

| Number | Name | Date |
|---|---|---|
| 1,361,946 | Whitaker | Dec. 14, 1920 |
| 1,583,396 | Demuth | May 4, 1926 |
| 1,706,051 | Auchincloss | Mar. 19, 1929 |
| 1,929,644 | LeRoy | Oct. 10, 1933 |
| 2,102,962 | Ludington | Dec. 21, 1937 |
| 2,209,081 | Rocic | July 23, 1940 |
| 2,218,188 | Wittenberg | Oct. 15, 1940 |
| 2,334,448 | Sheridan | Nov. 16, 1943 |

FOREIGN PATENTS

| Number | Country | Date |
|---|---|---|
| 524,940 | Great Britain | Aug. 19, 1940 |